May 19, 1931.  W. A. STREET  1,805,643
AUTOMOBILE OR TRAFFIC SIGNAL
Filed Oct. 13, 1930
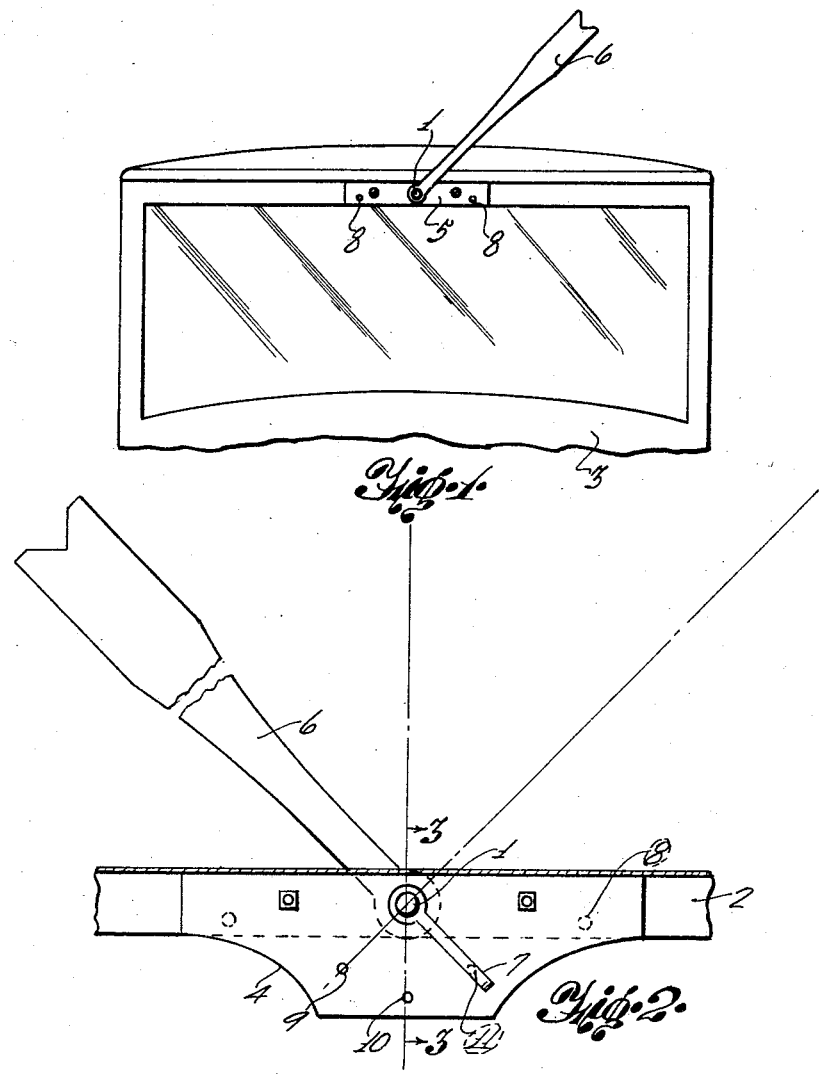
Inventor
William A. Street
By Adam E. Fisher
Attorney Patented May 19, 1931

1,805,643

UNITED STATES PATENT OFFICE

WILLIAM A. STREET, OF BELINGTON, WEST VIRGINIA

AUTOMOBILE OR TRAFFIC SIGNAL

Application filed October 13, 1930. Serial No. 488,292.

This invention is an automobile or traffic signal, for use by the driver of an automobile in signaling to cars following, his intention to turn to the right or left, or to stop.

An object of the invention is to provide a manually operable signal, mounted at the middle of the frontal portion of the top of the car, the same being in the general form of an arm or blade adapted to swing to right, left or straight up positions to indicate right and left turns or stops.

Another object is to provide a traffic signal in the form of an arm or blade mounted on the shaft journal through the front top bow of the car, the rear or inner end of the shaft being provided with a suitable handle for the manipulation of the signal arm.

Another object is to provide a signal assembly including a signal arm mounted or journaled at the top of the front of the car in such manner that it may be dropped to the level of the top when not in use, and thus out of sight of the drivers of cars following.

In the drawings

Figure 1 is a frontal elevation of the upper frontal portion of an automobile, showing my invention mounted thereupon;

Figure 2 is a rear elevation of the upper frontal portion of an automobile, showing my invention mounted thereupon, the said view being enlarged relative to Figure 1;

Figure 3 is a sectional detail on the line 3—3 of Figure 2.

The invention comprises a stub shaft 1 journaled through the center of the front top bow 2 of the automobile 3 and through the mounting pieces or plates 4 and 5 secured to either side of the said bow. To the outer end of the shaft 1 is rigidly attached the inner end of the signal arm 6, while to the inner end of the shaft 1 is rigidly attached the upper end of the handle 7, the lower end thereof depending for the convenience of the driver in the manipulation of the signal arm. Stop pins 8 are mounted in the outer mounting piece or plate 5 near the ends thereof, the same serving as stop or rest pins for the arm 6 when same is not actually functioning as a signal. In this connection it will be noted that the arm 6 is less in length than one-half the width of the automobile, so that when the arm is at rest, it will not project beyond the sides of the automobile and thereby give a false signal. Position indicating studs 9, 10 and 11 are mounted upon the inner mounting plate 4 in such position that when the handle 7 is moved over the right hand stud 11, the arm 6 will be directed angularly up and towards the left, whereby drivers of cars at the rear will readily understand that a turn to the left is intended. Similarly, when the handle 7 is moved immediately over the left hand pin 9, those at the rear would understand a right hand turn was intended. And when the handle 7 is moved over the pin 10, the arm 6 would stand straight up, which would indicate that a stop was intended.

While I have herein described a certain specific manner and method of constructing and assembling the elements of my invention, it is understood that I may vary from the same in minor details, not departing from the spirit of my invention, so as best to construct a practical device for the purpose intended, as defined in the appended claim.

I claim:

In combination with an upper frontal part of an automobile, a stub shaft journaled centrally through the said part, a signal arm rigidly secured to the outer end of the stub shaft, the said arm being of such length as not to extend beyond the sides of the automobile when thrown over to either side but being visible above the top of the car when turned angularly upward at either side or when directed straight up, a handle rigidly secured to the inner end of the said shaft, position indicating studs mounted under the said handle and whereby the angularity of elevation of the said arm may be indicated to the driver through the sense of touch, the said studs serving also as finger holds for steadying and supporting the driver's hand while maintaining the signal arm in the required position, and stop pins arranged laterally for the said arm to rest upon when not in use.

In testimony whereof I affix my signature.

WILLIAM A. STREET.